June 27, 1967     J. D. McCLARRAN     3,327,570
TIRE MOLDS
Filed Dec. 16, 1965
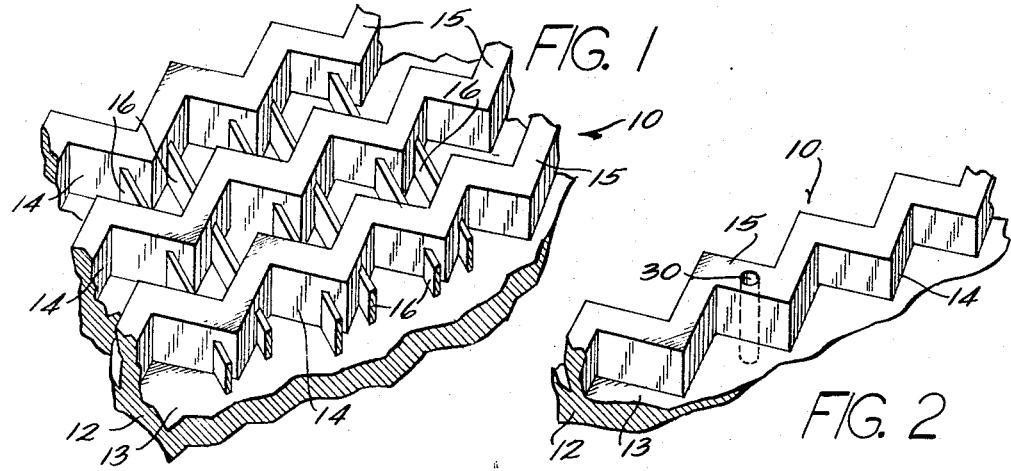
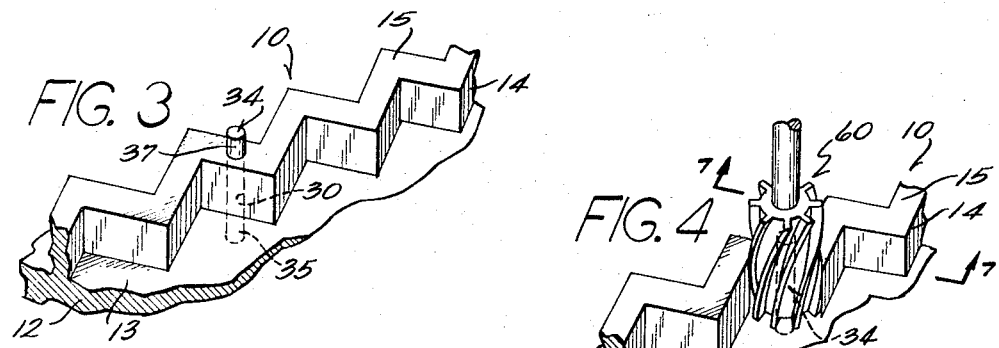
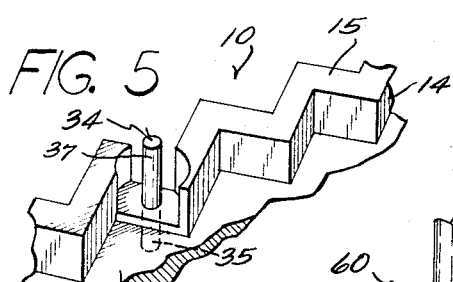
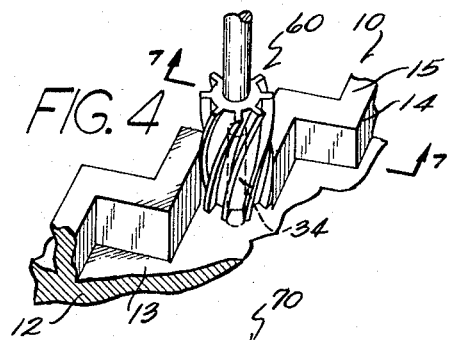
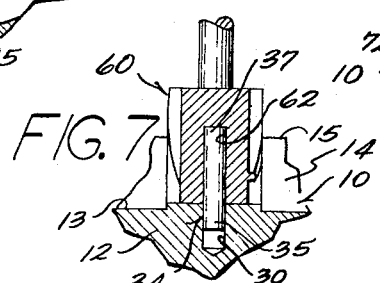
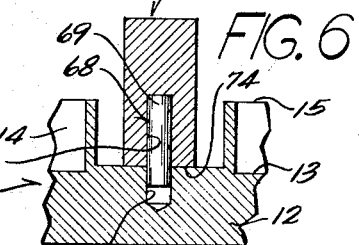
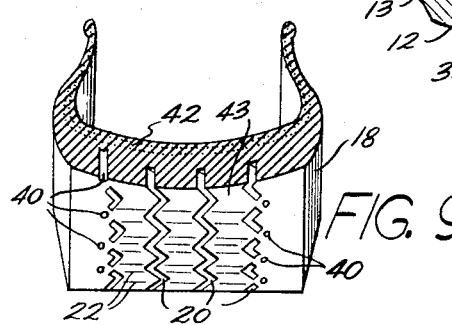
INVENTOR
JAMES D. McCLARRAN
BY Wheeler, Wheeler & Wheeler
ATTORNEYS

United States Patent Office 3,327,570
Patented June 27, 1967

3,327,570
TIRE MOLDS
James D. McClarran, Barberton, Ohio, assignor to The Shaler Company, Wilmington, Del., a corporation of Delaware
Filed Dec. 16, 1965, Ser. No. 514,245
16 Claims. (Cl. 76—107)

This invention relates to methods of modifying tire molds.

An object of the invention is to provide a simple, efficient and inexpensive method of modifying a tire mold to adapt it for manufacturing rubber tires which are adapted for utilizing traction studs.

I will refer to the surface of a tire mold which forms the circumference of the finished tire, that is the tread surface, as the bed of the mold. The bed will be regarded as the bottom of the mold, regardless of its orientation. Most such molds have major ribs extending the full depth of the finished tread to form the main channels in the tread pattern. Many molds also have small ribs, which may be of of lesser height than the main ribs to form sipes, or relatively narrow grooves in the tread of the finished tire. My method is equally effective regardless of the tread design incorporated in the mold.

In accordance with the invention, my method of modifying a tire mold is applied to a mold having a bed defining the tread surface and one or more ribs extending from the bed to produce grooves in the tread. The method produces a mold adapted to make tires with holes for tire studs, each hole being surrounded with rubber for a predetermined distance to support the stud in use. The method comprises the steps of, drilling a hole in the tire mold, inserting a pin in the hole, and cutting away a portion of the rib pattern of the tire mold surrounding the pin by running a cutting tool along the pin, using the pin as a guide and positioner for the cutting tool. The method further includes locating the free end of the pin a predetermined distance from the bed of the tire mold. The guide pin may itself be used as a mold pin, or if desired, the guide pin can be removed and a separate mold pin may be inserted in the hole.

Other objects, advantages and features will become apparent from the following description and accompanying drawings in which:

FIGURE 1 is a fragmentary perspective view of a tire mold;

FIGURE 2 is an enlarged view similar to FIGURE 1, showing one step of the invention;

FIGURE 3 is a view similar to FIGURE 2, showing a further step of the invention;

FIGURE 4 is a view similar to FIGURE 3, showing a further step in the invention;

FIGURE 5 is a view similar to FIGURE 4, showing the tire mold after completion of the step shown in FIGURE 4;

FIGURE 6 is a further enlarged, fragmentary side elevational view of the tire mold portion shown in FIGURE 5 and broken away to show an optional step of the invention;

FIGURE 7 is an enlarged, cross sectional view taken along line 7—7 of FIGURE 4;

FIGURE 8 is an enlarged, side elevational view, partially in cross section, of a portion of the tire mold shown in FIGURE 3, showing another optional step which may follow the step shown in FIGURE 3; and FIGURE 9 is a fragmentary, perspective view of a portion of a rubber tire manufactured from a tire mold modified in accordance with the method of the invention.

Referring now to the drawings and more particularly to FIGURE 1, the tire mold is generally identified by the numeral 10 and includes a bed 12 having a surface 13, one or more spaced main ribs 14 extending from the bed surface 13 and having a top surface 15, and sipe forming ribs 16 disposed between the ribs 14.

A tire 18 (FIGURE 9) manufactured from the tire mold 10 generally includes the zig-zag main grooves 20 which conform to the shape of the ribs 14, and sipes 22 which extend between the grooves 20 and which conform to the configuration of the sipe forming ribs 16. The depth of the grooves 20 is determined by the distance of the top surfaces 15 of the ribs 14 from the bed surface 13. Similarly, the depth of the sipes 22 is determined by the distance the ribs 16 extend above the surface 13 of the base or bed portion 12.

The method of modifying the tire mold 10 in accordance with the invention begins with the step of chipping away the sipe forming ribs 16, if any, to clear a working area. Next, I drill a hole 30, as shown in FIGURE 2, in the tire mold 10. The hole 30 may be formed in one of the ribs 14, as shown in FIGURE 2, or may be drilled directly into the bed 12 of the tire mold 10 between the ribs 14. If the hole 30 is drilled in the ribs 14 as shown in FIGURE 2, the hole may terminate above the surface 13 of the bed 12. Preferably, the hole 30 extends into the bed 12 for reasons to be hereinafter discussed.

After boring the hole 30, a guide pin 34 is inserted in the hole 30, as shown in FIGURE 3, so that the fixed end 35 is secured in the hole 30 and the free end 37 extends a predetermined distance above the surface 13 of the bed 12. Preferably, the free end 37 extends above the top surfaces 15 of the ribs 14. The extension of the pin 34 above the surface 13 of the bed 12 determines the depth of the molded hole 40 (see FIGURE 9) formed by the pin 34 in the rubber tire 18. Since the height of the ribs 14 determines the depth of the grooves 20 in the tire 18, the pin 34 preferably extends slightly beyond the top surfaces 15 of the ribs 14 so that the molded hole 40 in the tire 18 will extend deeper than the tread grooves in the tire casing 42 (see FIGURE 9). Thus a traction stud (not shown) can be inserted in the molded hole 40 with the enlarged head of the stud embedded in the tire casing 42 so that the working part of the stud is generally co-extensive with the tire tread 43.

For the purposes of accurately locating the free end 37 of the pin 34 a predetermined distance above the tops 15 of the ribs 14, the pin 34 may be driven into the hole 30 with a pin driver 50 (see FIGURE 8) having a blind central core 52 which telescopically receives the free end 37 of the pin and which has an end face 54 which engages the tire mold 10 to prevent further insertion of the pin 34 into the hole 30 when the free end 37 of the pin 34 is properly located relative to the top surfaces 15 of the ribs 14.

After the pin 34 has been inserted and properly located in the tire mold 10, a portion of the tire mold 10 surrounding the pin 34 is cut away by running a cutting tool along the pin 34, thereby using the pin as a guide and positioner for the cutting tool. As shown in FIGURES 4 and 7, the cutting tool employed is a milling cutter 60 having a blind central bore 62 which telescopically receives the free end 37 of the pin 34. The diameter of the milling cutter 60 determines the amount of tire mold material surrounding the pin 13 which will be cut away. The cut away portion of the tire mold 10 provides a solid slab or portion of rubber in the finished tire 18 (FIGURE 9). The solid portion surrounds the molded hole 40 and may interrupt the grooves 20 depending on the location of the pin 34, but in any case will provide an ungrooved portion in the tread of at least the diameter of the cutter 60.

The cutting tool penetration into the mold 10 is stopped at a predetermined distance from the bottom of the bored hole 30. For this purpose, the pin 34 is used as a depth gauge, in conjunction with blind hole 62 in the cutter 60, to prevent penetration of the cutting tool 60 beyond said predetermined distance from the bottom of the bored hole 30. As shown in FIGURE 7, the free end 37 of the pin 34 engages the bottom of the blind hole 62 in the milling cutter 60 to prevent further penetration of the milling cutter 60 into the tire mold 10. The blind hole 62 is dimensioned in accordance with the desired penetration of the milling cutter 60 into the tire mold 10, and the height of pin 34 is fixed by the depth of the desired hole in the finished tire, unless an optional method step is used, as described below. Preferably the penetration of the milling cutter 60 is stopped at a predetermined distance spaced from the bed surface 13, such as approximately $\frac{1}{32}$ of an inch from the bed surface 13.

The pin 34 may be used as a mold pin to produce the molded hole 40 in the rubber tire 18, in which case the pin 34 is securely anchored in the bored hole 18. For this purpose, the pin 34 can be dimensioned to provide an interference fit between the pin 34 and the bored hole 30, at least at the end of the pin, in which case the pin 34 is driven into the bored hole 30. Therefore, when the portion of the tire mold 10 surrounding the pin 34 is cut away, the pin 34 is securely anchored in the remaining portion of the bore 30.

In the alternative, a looser fit may be used so that the pin 34 may be removed from the bored hole 30 after the milling step and a separate mold pin 68 (see FIGURE 6) may be inserted into the hole 30 so that the pin 68 extends the desired predetermined distance above the top surfaces 13 of the ribs 14. For this purpose, a pin driver 70 has an end face 74 and a blind central bore 72 of predetermined depth which automatically locates the free end 69 of the mold pin 68 said predetermined distance above the top surfaces 15 of the ribs 14 when the end face 74 engages the tire mold 10. The mold pin 68 is securely anchored in the bore 30 with an interference fit between the pin and the bore, as previously described.

The use of this alternate step permits the use of a guide pin 34 with different characteristics from mold pin 68. For example, it may be harder to resist wear during milling of the ribs, or it may be longer to provide more secure guidance of the cutter 60.

The method may also include the steps of blast peening the tire mold 10 with glass shot in the area of the cut away portion to provide a uniform finish.

I claim:

1. A method of modifying a tire mold to produce a tread area having a molded hole surrounded by a predetermined area of ungrooved rubber, said mold having a bed, and at least one rib extending from the bed, said method comprising the steps of forming a hole in the tire mold, inserting a pin into the hole, and cutting away a portion of the tire mold surrounding the pin by operating a cutting tool around the pin as an axis to thereby use the pin as a guide and positioner for the cutting tool.

2. A method in accordance with claim 1 including the steps of removing the pin from the tire mold and driving a separate mold pin into the hole so that the mold pin is securely anchored in the hole, and locating the free end of the mold pin a predetermined distance from one of the bed and the tops of the ribs.

3. A method in accordance with claim 1 including the steps of stopping cutting tool penetration into the mold at the predetermined distance from the bottom of the hole by using the pin as a depth gauge to prevent penetration of the cutting tool beyond said predetermined distance from the bottom of the hole.

4. The method of claim 1 in which the hole formed initially extends into the bed, said pin having a fixed end extending into the bed and a free end extending beyond the tops of the ribs.

5. A method in accordance with claim 4 including the steps of removing the pin from the tire mold, driving a separate mold pin into the hole formed initially so that the mold pin is securely anchored in the hole, and locating the free end of the mold pin a predetermined distance above the tops of the ribs.

6. A method in accordance with claim 4 wherein the steps of inserting the pin into the initially formed hole includes the steps of securely anchoring the pin in the hole and said method further includes the steps of accurately locating the free end of the pin a predetermined distance above the bed.

7. A method in accordance with claim 6 wherein the steps of locating the pin a predetermined distance above the bed includes the steps of driving the pin into the hole with a pin driver having an end face and a blind bore of predetermined length and which is adapted to telescopically receive the pin, the pin being driven into the hole until the end face of the pin driver engages the surface of the tire mold to prevent further insertion of the pin into the hole whereby the pin is positioned a predetermined distance beyond the bed.

8. A method in accordance with claim 4 including the steps of stopping cutting tool penetration into the tire mold at a predetermined distance beyond the bed by using the pin as a depth gauge to stop penetration of the cutting tool into the tire mold when the cutting tool has penetrated the tire mold said predetermined distance beyond the bed.

9. A method in accordance with claim 4 wherein said steps of cutting away a portion of the tire mold surrounding the pin includes the steps of rotating a milling cutter having a blind bore adapted to telescopically receive said pin around said pin as an axis and advancing said cutter axially into the tire mold, whereby the mold pin serves as a guide, stabilizer and positioner for the milling cutter.

10. A method of modifying a tire mold having a bed, main ribs extending from the bed, and sipe forming ribs between the main ribs, said method comprising the steps of forming an initial hole in the tire mold so that the hole extends into the bed of the tire mold, driving a pin into the hole until the fixed end of the pin extends into the bed of the tire mold and the free end of the pin extends slightly above the tops of the ribs, accurately locating the free end of the pin above the tops of the ribs, cutting away a portion of the tire mold surrounding the pin by running a milling cutter along the pin, the milling cutter having a blind hole which telescopically receives the pin so that the pin serves as a guide, a stabilizer, and a positioner for the cutting tool, and stopping cutting tool penetration into the mold at a predetermined distance from the surface of the tire mold by using the pin as a depth gauge whereby the free end of the pin engages the bottom of the blind hole in the milling cutter to prevent penetration of the cutting tool beyond said predetermined distance.

11. A method in accordance with claim 10 including the steps of removing the pin from the tire mold, driving a mold pin into the initially formed hole so that the mold pin is securely anchored to the tire mold, and accurately locating the free end of the mold pin a predetermined distance above the tops of the ribs.

12. A method in accordance with claim 10 wherein the steps of inserting the pin into the tire mold includes the steps of driving the pin into the hole so that the pin is securely anchored to the tire mold.

13. A method in accordance with claim 11 wherein said step of preventing cutting tool penetration terminates when the cutting tool has penetrated to a distance of $\frac{1}{32}$ of an inch above the bed of the tire mold.

14. A method in accordance with claim 10 including the steps of driving the pin to a predetermined depth with a mold pin driver having an end face and a central bore which receives the mold pin, the pin is driven into the bored hole until the end faces of the driver engages the tire mold whereby the mold pin is properly positioned.

15. A method in accordance with claim 10 including the steps of blast peening with glass shot the tire mold in the area of the cut away portion to provide a smooth finish.

16. A method in accordance with claim 10 including the steps of chipping away the sipe forming ribs from the tire mold to clear away a working area prior to forming the initial hole.

No references cited.

GRANVILLE Y. CUSTER, Jr., *Primary Examiner.*